United States Patent

[11] 3,581,668

| [72] | Inventor | Luis Ingels<br>1642 Second St., Duarte, Calif. 91010 |
|---|---|---|
| [21] | Appl. No. | 729,357 |
| [22] | Filed | May 15, 1968 |
| [45] | Patented | June 1, 1971 |

[54] REMOTE CONTROL EQUIPMENT APPLICABLE TO TOY RACING CARS
4 Claims, 10 Drawing Figs.

| [52] | U.S. Cl. | 104/149, 46/243, 180/79.1 |
|---|---|---|
| [51] | Int. Cl. | A63h 33/26 |
| [50] | Field of Search | 180/2, 79.1; 46/243 |

[56] References Cited
UNITED STATES PATENTS
3,339,653   9/1967   Chaplenko ................. 104/149(UX)

*Primary Examiner*—Arthur L. La Point
*Assistant Examiner*—George H. Libman
*Attorney*—Le Roy J. Leishman ABSTRACT: A remote control system applicable to the driving and steering mechanism of miniature racing cars, or the like, comprising two direct current motors M2 and M3 (FIG. 5) located within the car, one of said motors positively connected to the drive shaft of the car and the other positively connected to its steering mechanism; and a remote control unit (FIGS. 6, 7 and 8) free from mechanical connection to the car, said control unit comprising a steering control wheel 9 having means associated therewith whereby the turning of said control wheel in one direction will cause the motor M3 operatively connected to the steering mechanism in the car to turn its steering wheels to the right and the turning of said control wheel in the opposite direction will cause said steering mechanism to turn the car's steering wheels to the left.

Patented June 1, 1971
3,581,668
2 Sheets-Sheet 1
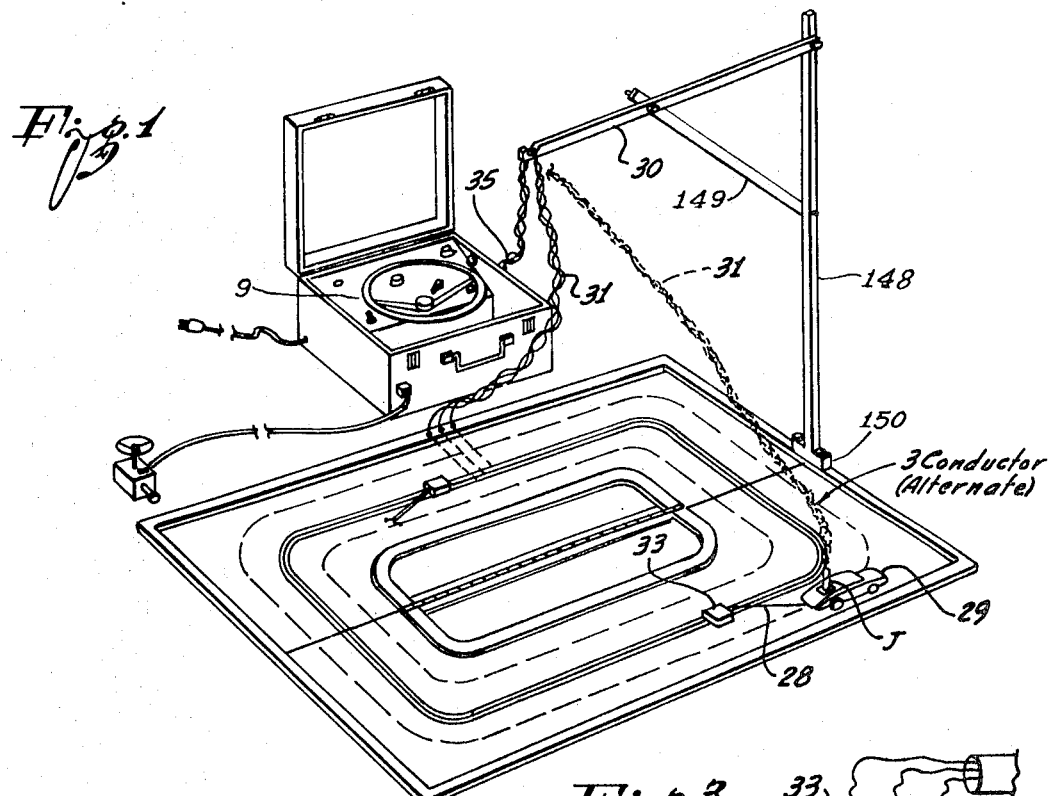
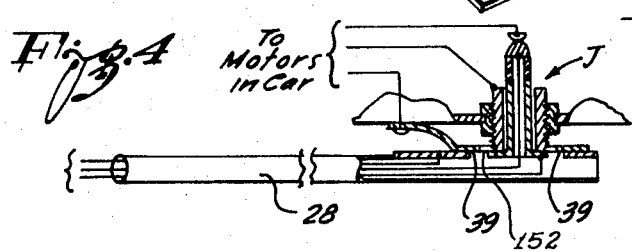
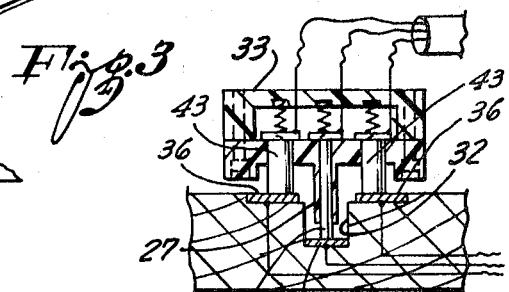
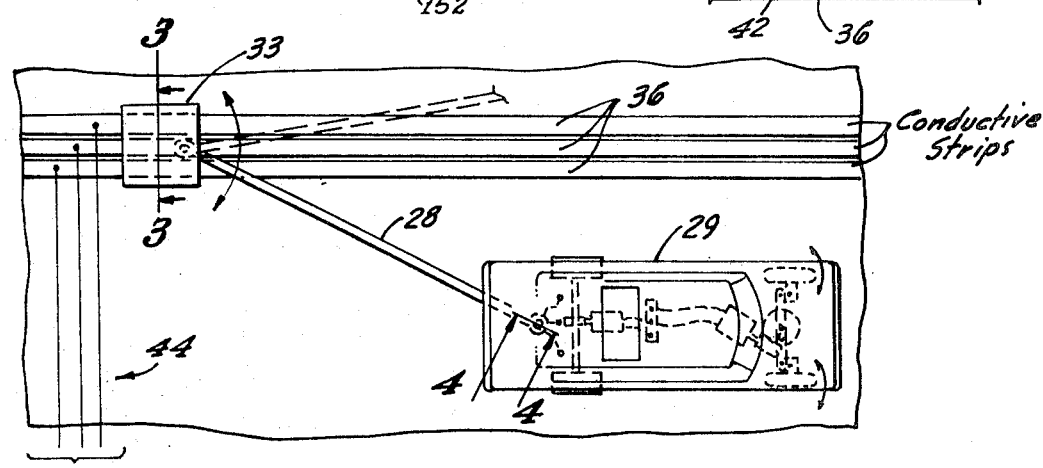
INVENTOR:
Luis Ingels
By LeRoy J. Leishman
AGENT Patented June 1, 1971 3,581,668
2 Sheets-Sheet 2
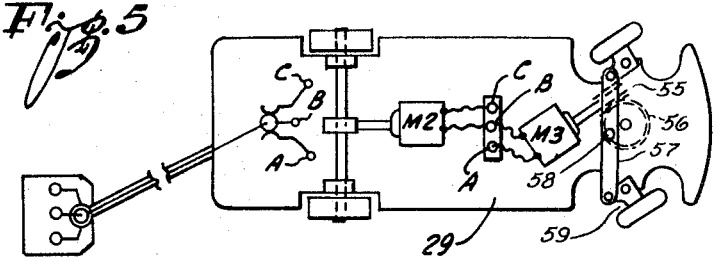
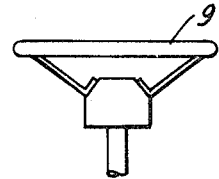
INVENTOR:
Luis Ingels
By LeRoy J. Leishman
AGENT

REMOTE CONTROL EQUIPMENT APPLICABLE TO TOY RACING CARS

SUMMARY

A remote control system for slot cars and the like comprising one direct current motor in the car positively connected to its driving wheels, and a second direct current motor in said car positively connected to its steering mechanism whereby said mechanism will turn the car's steering wheels to the right or left in response to the movement in the same direction of a simulated steering control wheel remote from the car and having no mechanical connection thereto.

IN THE DRAWINGS

FIG. 1 is a general view of a control unit and a slot track with a track follower thereon attached to a maneuverable car by a conductor-carrying tube that is pivoted at one end to the follower and at its other end to the car.

FIG. 2 is a closeup view of the car linked to the track follower shown traversing the slot track and the associated conducting strips.

FIG. 3 is a section taken on line 3—3 of FIG. 2.

FIG. 4 is a section, broken away, of the conductor-carrying link and its connections to the internal parts of the multiple contact jack inserted in the car. For clarity, the shell of the jack has been removed in this figure.

FIG. 5 shows the motors and steering mechanism within the car.

FIG. 6 shows the mechanism and electrical components within the control unit.

FIG. 7 is a combination schematic and isometric drawing of the connected components in the control unit, with the supporting structure shown in FIG. 6 omitted to permit an unobstructed view of the said components when pictured isometrically.

FIG. 8 is a schematic drawing of the transformer, rectifiers and rheostats in the control unit, together with the polarity of their terminal connections.

FIG. 9 is an electrical schematic of the motor connections within the car; and

FIG. 10 is a 3-contact jack utilized in the illustrative embodiments of the invention for connecting the current conductors to various mobile components.

The presently preferred embodiment of the instant invention comprises a so-called "slot car" having driving and steering mechanisms therein; and a control unit, free from mechanical connection with the car, from which the car may be remotely controlled.

The control unit includes: a steering wheel 9, FIGS. 1, 6, and 7; a forward-reverse switch 21, FIG. 7; a rheostat 22, FIG. 7, which functions as the accelerator; and a transformer 25, FIG. 8, having a plurality of secondaries S1 and S2. The opposite sides of secondary S2 are connected to the wipers of rheostats R1 and R2 through a pair of rectifiers 26 connected in reverse parallel so that on one half of the cycle the current flows in one direction through rheostat R1 and during the other half of the cycle through rheostat R2. These rheostats are used to equalize the current flowing on the opposite half cycles from secondary S2. The resistance element of rheostat R1 has a positive polarity while the resistance element of rheostat R2 has a negative polarity. These elements are connected respectively to terminals F and G, which are also shown in FIG. 7 where terminals B and C also appear. One of the three conductors that electrically connect the remote control unit to the car is common to both of the motors M2 and M3. In the control unit and in the car, the local conductors that must communicate with this common conductor are connected to a B terminal. The conductors connected to the A terminal are individual to the steering motor M3, while those connected to a C terminal are individual to the driving motor M2. Hence, the accelerator rheostat 22, as shown in FIG. 7, is connected by conductor 48 to the terminal C.

Other components of the presently preferred embodiment of the invention will probably be most easily understood if explained in connection with the operation of the complete apparatus.

The steering wheel 9, FIGS. 6 and 7, is integrally connected to the shaft 23, which carries the brush or wiper 6. Shaft 23 rotates in the journal 46 which is mounted between the two side members of the bracket 47. (This bracket and bracket 54 are both omitted from FIG. 6 to avoid obstructing the view of other components.)

The single-pole, double-throw switch 21, FIG. 7, is a forward and reverse control which reverses the direction of movement of the car by reversing the current through the driving motor M2. To effect this current reversal, the manually operable member 52, which carries a contact 51 intermediate its pivoted end 53 and its free end is moved into engagement with stationary contact 49 or 50. These two contacts are connected to opposite sides of the secondary S1, FIG. 8, through rectifiers 26a which are disposed in reverse parallel. The positive side of one of these rectifiers is connected to terminal +D (plus D) and the negative side of the other is connected to terminal —E (minus E).

The current that reaches the steering control motor M3 through the conductors that connect to the A terminals in the remote control unit and in the car, is picked up by the brush 6 either from segment 37 or segment 38, according to the direction in which the steering wheel is turned.

Inasmuch as the steering system must be capable of orienting the planes of rotation of the steering wheels as slowly or as rapidly as the operator may desire, the presently preferred embodiment of the invention includes apparatus that makes it possible to power motor M3 by impulses much more widely spaced in time than alternate half cycles of the commercial alternating current supplied to the primary of the transformer 25. The apparatus that accomplishes this includes the drum 3, FIGS. 6 and 7, the number of whose rotations in any given time interval is a submultiple of the cycle of the alternating current on which the device is operating, the ratio being the same as the ratio of the diameter of gear 10 to gear 10a. Thus, if the pitch diameter of gear 10 is 10 times that of gear 10a, the drum 3 will rotate 6 times per second if the unit is operating on 60 cycle current, and the brush 6 will pick up only 6 impulses per second from segment 37 or 38, depending, of courser, on the inclination of the steering wheel to the right or left.

The brush 6 is mechanically and electrically connected to the shaft 23, which is constantly engaged by the wiper 41. This is connected by conductor 45 to terminal A. Terminal A of the control unit is electrically connected by appropriate insulated cables to the terminals A of the car, which are connected to the steering motor M3. The current that drives the motor M1, on whose shaft gear 10a is rigidly mounted, is also supplied with current from terminals A and B, as shown in FIG. 6.

The shaft 23, which carries the brush 6, engages a nonconductive disc 5. This disc is mounted on the end of a nonconductive drum 3 which is coaxially secured to a second shaft 55, FIG. 6. Adjacent the disc 5, but spaced therefrom, a first metallic ring 4a embraces the drum, and a second metallic ring 4b also embraces the drum adjacent ring 4a, but spaced therefrom. The relatively large gear 10 is also secured to shaft 55. It meshes with the relatively small gear 10a secured to the end of the shaft of motor M1, which is mounted on bracket 54.

Two conductive segments 37 and 38 are secured to the nonconductive disc 5 diametrically opposite from each other, as best seen in FIG. 7. Segments 37 and 38 communicate electrically through the nonconductive drum with rings 4a and 4b, respectively. Brushes 7a and 7b pick up the electrical impulses from these rings, which are connected, as shown in FIG. 6, to terminal F+and G—which derive their current from secondary S2. The intermittent direct current from the conductive segments is picked up by brush 6 as indicated in FIG. 7 and as pictured more clearly in FIG. 6 where the enlarged end portion of conductive shaft 23 may be seen with brush 6 attached thereto and engaging the surface of the nonconductive disc 5 which carries the conductive segments 37 and 38 shown in FIG. 7.

FIG. 6 shows brush 41 on the enlarged end portion of conductive shaft 23, while FIG. 7 shows much of the circuitry, indicates the electrical communication of wiper 41 with shaft 23 by showing it wiping the side of the shaft. Conductor 45 connects the wiper 41 with terminal A which is connected by appropriate conducting means hereinafter explained to terminals A of the car. These are connected to the steering motor M3. The current that drives the control unit motor M1, on whose shaft gear 10a is rigidly mounted, is also supplied with current from terminals A and B, as shown in FIG. 6.

The broad term "slot car" must be construed as optionally including the slot follower 33, FIGS. 1, 2, 3 and 5, and its downwardly projecting member 27, FIG. 3, that extends into the slot 32, even through the follower may not be a part of the car itself. Member 27 is confined within the slot by the sides 32 of the slot itself, as will be apparent from an examination of FIG. 3. Member 27 has a spring-loaded plunger 42 extending therethrough to engage the center conductive strip 36 in the bottom of the slot. Spring-loaded plungers 43 engage the conductive strips on opposite sides of the top of the slot. The subsurface conductors 44, FIG. 2, connect the strips 36 to the current source in the control unit.

An alternative embodiment of the invention is that illustrated in FIG. 1 wherein the grooved tracks 32, FIG. 3, the associated conductive strips 36, FIG. 4, the track follower 33 and the hollow link 28 are all replaced by the suspended insulated conductors 31 shown in FIG. 1. For this alternative embodiment, the insulated 3-conductor cable may be hooked over the arm 30, as shown in the illustration. The arm 30 may be fastened to an upright 148 attached to the frame 51 as by a pedestal 150 connected to, or formed integrally with, the lower end of the upright. The arm 30 may be braced by a diagonal bar 149 secured at its ends to arm 30 and the upright 148. This pedestal may be fastened to the frame by screws or other equivalent means.

The jack J, as shown in FIG. 10, comprises insulated coaxial conductors and a conductive shell 40 insulated therefrom. The flared end of this shell engages the leaf spring 39, FIG. 4, which has a large enough opening 152 to clear the central conducting parts of the jack; and the end of the jack, as shown in FIG. 10, has two mutually insulated portions that engage mating elements in the socket that receives the jack in a manner well known in the art and therefore neither illustrated nor described herein.

The conductors that carry the current from the control unit to the car are labeled A, B, and C, as shown by the terminals to which they connect in both FIGS. 5 and 7. The forward or reverse movement of the car is controlled by the single-pole, double-throw switch 21, shown near the center of FIG. 7. Conductor B, it will be observed in both FIG. 5 and FIG. 6, is common to both motors M2 and M3. When conductor B is energized, along with the common conductor C, motor M2 rotates in one direction or the other, depending upon which of the poles of switch 21 is engaged by the central control lever of this switch.

As heretofore explained, Motor M3, FIG. 5, controls the steering, and whether it causes the steering wheels to be positioned for moving the car to the right or the left is determined by the direction in which the steering wheel 9 of the master control is urged by the person operating the master control unit, this positioning of the steering wheel 9 thus causing the intermittent direct current to flow in the direction determined by its polarity, as previously explained. The worm 55, FIG. 5, is rigidly mounted on the outer end of the shaft of motor M3. This worm meshes with the worm wheel 56. Near the outer edge of the worm wheel 56, a tie bar 57 is centrally pivoted thereto at 58. This moves the L-shaped lever 59 and the similar L-shaped lever associated with the other steering wheel for directing the vehicle either to the right or the left, depending upon the direction of the intermittent direct current. The direction in which the steering wheels are oriented is thus controlled by moving the steering wheel of the control unit either to the right or to the left.

It will be understood that various modifications and transpositions may be made in any of the elements hereinbefore discussed and shown in the Figures and that any of the components may be omitted and replaced by other components performing the same function or the same function plus additional functions without departing from the broad spirit of the invention as succinctly set forth in the appended claims.

I claim:

1. Remote control apparatus for maneuvering a four-wheel-supported vehicle over a two-dimensional surface, said vehicle having two driving wheels and two guiding wheels; a first and a second direct current motor, said first motor being positively connected to said driving wheels for rotating them selectively in opposite directions, and said second motor operatively connected to said guiding wheels for orienting their planes of rotation selectively to the right or left;

a control unit comprising a. a transformer having a primary connectable to an alternating current source, and a pair of secondaries;

b. instrumentalities whereby the direction of rotation of said first motor may be reversed and its speed of rotation controlled, said instrumentalities comprising a single-pole, double-throw switch for reversing the direction of rotation of said first motor in order to reverse the direction of movement of said vehicle, said switch having a pivoted manually movable operating member carrying a first contact intermediate its pivoted and free ends and a pair of stationary contacts disposed on opposite sides of said first contact, a first pair of rectifiers connected in reverse parallel between opposite sides of one of said secondaries and said stationary contacts, and a first rheostat in series with said first contact and a conductor that is individual to said first motor for controlling the speed thereof;

c. means whereby the operator is able to steer said vehicle, said means comprising a steering wheel rigidly fixed to a conductive first shaft, a rotatably mounted second shaft free from engagement with said first shaft but coaxially aligned therewith, a nonconductive drum coaxially secured to said second shaft, a nonconductive disc coaxially supported on the end of said drum facing said first shaft, a first metal ring embracing said drum next to said disc but spaced therefrom, a second metal ring embracing said drum next to said first ring but spaced therefrom, a relatively large gear secured to said second shaft adjacent said second ring but spaced therefrom, a third direct current motor disposed in proximity to said second shaft, said third motor having a relatively small gear secured to its shaft, said relatively small gear meshing with said relatively large gear, the ratio of said gears determining the intervals between the impulses passing through said rings for transmission to said second motor;

said nonconductive disc have a pair of conductive segments thereon disposed on opposite sides of the rotational axis of said drum, one of said segments communicating electrically internally of said drum with said first ring and the other segment communicating electrically internally of said drum with said second ring, a first brush engaging said first ring and a second brush engaging said second ring, a second pair of rectifiers connected in reverse parallel to opposite sides of the other of said secondaries, the positive side of one of said second pair of rectifiers connected to the wiper of a second rheostat and the negative side of the other of said second pair of rectifiers connected to the wiper of a third rheostat, the resistance elements of said second and third rheostats connected to said first and second brushes respectively, said second and third rheostats available for equalizing the current on opposite halves of the cycle of the current passing through said other secondary, a third brush secured to said first shaft for wiping said segments whereby the angular position of said steering wheel determines the polarity of the impulses passing to and through said second motor and consequently its direction of rotation and whether the guiding wheels will direct the vehicle to the right or left.

2. The combination set forth in claim 1 in which said two-dimensional surface is grooved to provide a slot to serve as a track and to which a slot follower is added, said slot follower being connected to said vehicle by a link pivoted at one end of the follower and at the other end to said vehicle, said follower having a member extending downward from the main body thereof into said slot so that the slot will mechanically constrain the follower to traverse a predetermined course.

3. The combination set forth in claim 2 in which there is a substantially flat conductor disposed in the bottom of said slot and second and third substantially flat conductors disposed on respectively opposite side of the top of said slot, and in which said member has a conducting element depending therefrom said element spring-loaded into engagement with said substantially flat first conductor; said follower also having two spring-loaded metallic contactors disposed on opposite sides of said member for engaging said second and third substantially flat conductors respectively; said link being hollow and having three insulation-covered conductors passing therethrough for transmitting the intermittent current picked up by said element and contactors to the motors in the vehicle.

4. The combination set forth in claim 3 in which portions of said current conductors are suspended from a support that overlies said two-dimensional surface and is fixed in position with respect thereto.